Jan. 4, 1944.  F. J. LINGEL  2,338,694
ELECTRICAL MEASURING INSTRUMENT
Original Filed Aug. 11, 1941
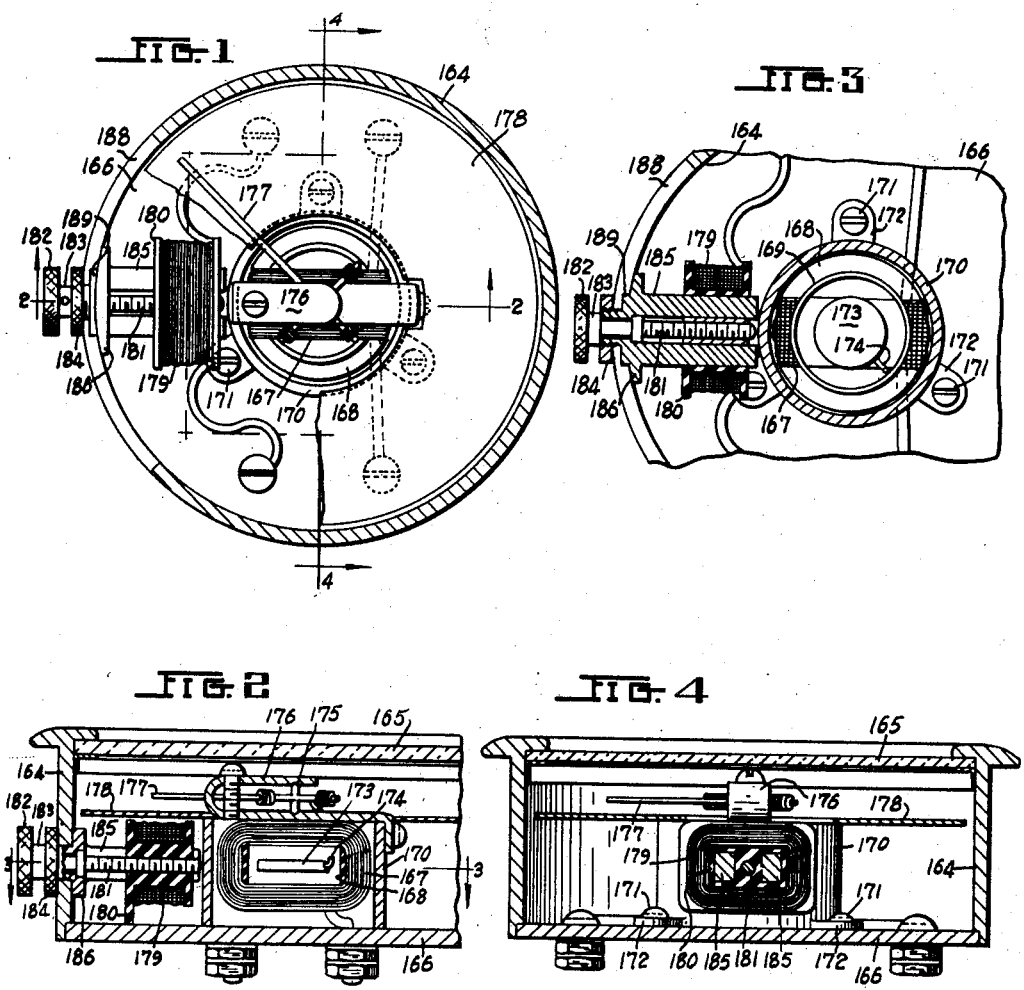
INVENTOR
FREDERICK J. LINGEL,
BY  ATTORNEYS Patented Jan. 4, 1944

2,338,694

UNITED STATES PATENT OFFICE 2,338,694

ELECTRICAL MEASURING INSTRUMENT

Frederick Joseph Lingel, Bluffton, Ohio, assignor to The Triplett Electrical Instrument Co., Bluffton, Ohio, a corporation of Ohio Original application August 11, 1941, Serial No. 406,336. Divided and this application March 9, 1942, Serial No. 433,959

6 Claims. (Cl. 171—95)

The present invention relates to electrical measuring devices and particularly to meters such as an ohm meter for determining the ratio between two currents or two voltages, etc.

This application is a division of my parent application, Serial No. 406,336, filed August 11, 1941.

The primary object of the present invention is to provide an improved measuring device for determining the ratio between two currents.

Another object is to provide an ohm meter in which the variations of the actuating electromotive force are utilized at the meter and do not affect the indications of the instrument.

Still another object is to provide a current-indicating ratio meter of a rugged character, and in which one or both of the measuring coils are stationary and the movable element or elements are constituted of magnetic vanes.

The general object of the invention is to provide an improved meter for giving an accurate direct reading of two or more current or voltage values in terms of their ratios, notwithstanding variations in the electromotive force which energizes the instrument.

Figure 1 shows one form of the improved ratio meter;

Figure 2 is a sectional view taken along the line 2—2 in Figure 1;

Figure 3 is a sectional view taken along the line 3—3 in Figure 2, and looking in the direction of the arrows;

Figure 4 is a sectional view taken along the line 4—4 in Figure 1.

The moving system of the usual type of D'Arsonval indicating electrical instrument is caused to deflect under the influence of a torque exerted thereon by current flowing through a coil suspended between the pole faces of a permanent magnet. The deflection is limited and the moving system comes to rest at a point where the restoring torque is equal and opposite to the deflecting torque. This restoring torque is usually applied to the moving system through a spiral torsion spring, which spring exerts a mechanical bias in direct proportion to the deflection. In many places where an electrical instrument of the indicating type could be used, the power supply is not a constant voltage. Such application includes aircraft and automotive installation and many others where the source of power consists of a battery or generator. The voltage applied to the electrical circuit in such a system is subject to numerous influences tending to cause it to vary. For instance, both the battery and generator voltages are functions of the rate at which they are supplying power. The battery voltage is further affected by the amount it has been discharged. The generator voltage is also a function of its speed and would vary with the speed of its prime mover.

The above discussion as regards the introduction of errors by voltage fluctuation is also applicable to a moving van type instrument in which the torque is exerted on the moving system by the interaction of a magnetic field set up in a coil by a current flowing through the same, and an iron vane rotatably suspended in the field of the coil. In this case, the vane may be either permanently magnetized or not. In either case the net effect of a voltage fluctuation is to cause the magnetic field to fluctuate and the reaction of the vane thereon to fluctuate. The fluctuating force exerted on the vane is opposed by a steady torsional force from the spiral spring and the moving system is, therefore, not at rest. Any measuring device, therefore, based on the voltage of a battery or generator balanced against the mechanical bias of a torsional spring will be in error by at least the same amount as the voltage.

The ratio meter shown in Figures 1 to 4 is contained within a case 164, the case being provided with a glass cover 165 at the top and closed at the bottom by a plate 166. The case 164 contains a coil 167 wound on a webbed T-shaped form 168, of which the short leg extends in a vertical direction and is indicated at 169. There is a cylinder 170, of non-magnetic or magnetic metal, immediately surrounding the coil 167, this cylinder being secured to the closure plate 166 by screws 171, positioned in the lugs 172. There is a magnetic vane 173 preferably magnetized, this vane being suspended in position from a rod 174 which is pivotally journalled as indicated at 175 in a U-shaped bearing member 176 which is secured to the top of the cylinder 170. The rod 174 carries a pointer 177 and is adapted to swing over a dial 178.

Perpendicularly aligned with the horizontal axis of the coil 167, as seen in Figure 2, there is a coil 179, the effect of which, when energized, is to produce a magnetic field which passes through the cylinder 170 and acts upon the magnetic vane 173. This coil is carried on a non-magnetic bobbin 180 which has a threaded bore extending longitudinally thereof. This bore receives a threaded rod 181, the rod terminating at its left-hand end in a thumb nut 182. This nut is provided with a shouldered portion 183 which bears against a nut 184, preferably of uniform thickness. Consequently by turning the thumb nut 182, for example in the counterclockwise direction looking from the left in Figure 3, the coil 179 can be caused to recede from the cylinder 170 and in this manner the intensity of the magnetic field impressed on the vane 173 is increased.

The bobbin 180 is also supported by a horizontally extending forked member 185 made of non-magnetic material, the furcations of which are preferably rectangular in shape and extend all the way through the bobbin. The legs of the forked member terminate at the left-hand end, as seen in Figure 3, in a shoe 186, which has an arcuate outer surface adapted to slide along the inner surface of the case 164. The shoe is threaded at its extreme left-hand end, as indicated at 187, to receive the nut 184 which carries threads on its interior bore.

The case 164 is provided with a horizontal slot 188, this slot extending over a limited angle and having a width loosely to accommodate a shouldered portion formed on the shoe 186, and also to accommodate the threaded portion 187 of the shoe. It is apparent that by loosening the nut 184 the shoe 186 can be moved through an arcuate path determined by the slot in the case 164, thus giving the coil 179 any desired angle of presentation to the vane 173. It has been pointed out that by turning the nut 182 in the counter-clockwise direction the coil 179 can be caused to recede from the vane 173 so that any intensity of magnetic field produced by the coil 179 and any direction of the field with respect to the vane 173 may be obtained by manipulating the nuts 182 and 184.

In practice the coils 167 and 179 would be connected in any well-known and suitable manner so that the magnetic field generated by one of the coils, for example coil 167, would react on the magnetized vane 173 to move the pointer 177 over the dial in opposition to a restoring force which may be exercised by the coil 179, also acting on the vane 173. The strength of this restoring force may be regulated by giving the coil 179 any desired cant or by moving the coil to any desired distance from the vane, in the manner described hereinbefore.

It will be understood that I desire to comprehend within my invention such modifications as come within the scope of the claims and the invention.

Having thus fully described my invention, what I claim as new and desire to secure by Letters Patent, is:

1. An electrical measuring instrument for determining the ratio between two currents, said instrument comprising a pair of coils, means for mounting each of said coils, means for adjusting one of said coils for independent movement in either of two directions to vary the angular relationship of one coil with respect to the other, a magnetic vane contained in one of said coils and responsive to the magnetic fields produced by both of said coils when energized respectively by said currents, said vane being carried on a rod which is adapted to move, and a pointer seccured to said rod whereby when the coils are energized the pointer will take a position to indicate the ratio between said two currents.

2. An electrical measuring instrument for determining the ratio between two currents, said instrument comprising a pair of coils, means for mounting each of said coils, means for adjusting one of said coils for independent movement in either of two directions to vary the angular relationship of one coil with respect to the other, one of said coils being adapted to be moved along its axis so as to change its rectilinear distance with respect to the other coil, said movable coil being also adapted to move in an angular direction whereby the intensity of the magnetic field of the movable coil, also the direction of the magnetic field are adapted to be changed, a magnetic vane contained in one of said coils and responsive to the magnetic fields produced by both of said coils when energized respectively by said currents, said vane being carried on a rod which is adapted to move, and a pointer secured to said rod whereby when the coils are energized the pointer will take a position to indicate the ratio between said two currents.

3. An electrical measuring instrument for determining the ratio between two currents, said instrument comprising a pair of coils, means for mounting each of said coils, means for adjusting one of said coils for independent movement in either of two directions to vary the angular relationship of one coil with respect to the other, one of said coils being adapted to be moved along its axis so as to change its rectilinear distance with respect to the other coil, said movable coil being also adapted to move in an angular direction whereby the intensity of the magnetic field of the movable coil, also the direction of the magnetic field are adapted to be changed, a magnetic vane contained in the stationary coil and responsive to the magnetic fields produced by both of said coils when energized respectively by said currents, said vane being carried on a rod which is adapted to move, and a pointer secured to said rod whereby when the coils are energized the pointer will take a position to indicate the ratio between said two currents.

4. An electrical measuring instrument for determining the ratio between two currents, said instrument comprising a pair of coils, the axes of which are positioned angularly with respect to one another, a magnetic vane contained in one of said coils and responsive to the magnetic fields produced by both of said coils when energized respectively by said currents, said coils being contained in a casing, means for mounting each of said coils, and means for adjusting one of said coils for independent movement in either of two directions, said means including an element which is accessible from the exterior of the casing.

5. An electrical measuring instrument for determining the ratio between two currents, said instrument comprising a pair of coils, the axes of which are positioned angularly with respect to one another, a magnetic vane contained in one of said coils and responsive to the magnetic fields produced by both of said coils when energized respectively by said currents, said coils being contained in a casing, means mounting one of said coils within the casing, and the other of said coils being mounted on a rod which extends through a slot in the casing, said rod being adapted to be moved circumferentially of the casing in order to vary the position of the coils with respect to one another.

6. An electrical measuring instrument for determining the ratio between two currents, said instrument comprising a pair of coils, the axes of which are positioned angularly with respect to one another, a magnetic vane contained in one of said coils and responsive to the magnetic fields produced by both of said coils when energized respectively by said currents, said coils being contained in a casing, one of said coils being mounted on a rod which extends through a slot in the casing, said rod being adapted to be moved circumferentially of the casing in order to vary the position of the coils with respect to one another, and means for locking said rod with respect to said casing after a predetermined circumferential movement of said rod has been made.

FREDERICK JOSEPH LINGEL.